(12) United States Patent
Verwys et al.

(10) Patent No.: US 10,343,599 B2
(45) Date of Patent: Jul. 9, 2019

(54) VEHICLE ASSEMBLY HAVING LUMINESCENT FEATURE AND METHOD

(71) Applicant: Honda Motor Co., Ltd., Tokyo (JP)

(72) Inventors: Nichole A. Verwys, Marysville, OH (US); Philip Z. Teano, Huntington Beach, CA (US); Zachary Segraves, Redwood City, CA (US); Thomas G. Kracker, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/429,858

(22) Filed: Feb. 10, 2017

(65) Prior Publication Data
US 2018/0229651 A1   Aug. 16, 2018

(51) Int. Cl.
*B60Q 3/80* (2017.01)
*B60Q 3/208* (2017.01)
*B60J 7/043* (2006.01)
*B60Q 1/26* (2006.01)
*B60Q 3/74* (2017.01)

(52) U.S. Cl.
CPC .............. *B60Q 3/208* (2017.02); *B60J 7/043* (2013.01); *B60Q 1/268* (2013.01); *B60Q 3/745* (2017.02); *B60Q 3/80* (2017.02)

(58) Field of Classification Search
CPC .............. B60Q 3/208; B60Q 3/24; B60J 7/043
See application file for complete search history.

(56) References Cited

U.S. PATENT DOCUMENTS

| | | | |
|---|---|---|---|
| 3,185,650 A | 5/1965 | Gurnee et al. | |
| 4,663,214 A | 5/1987 | Coburn, Jr. | |
| 4,934,753 A | 6/1990 | Gajewski | |
| 5,321,069 A | 6/1994 | Owens | |
| 5,336,965 A | 8/1994 | Meyer et al. | |
| 5,339,550 A * | 8/1994 | Hoffman | B60Q 1/503 362/497 |

(Continued)

FOREIGN PATENT DOCUMENTS

| | | |
|---|---|---|
| CN | 202071757 U | 12/2011 |
| DE | 10319396 | 11/2004 |

(Continued)

OTHER PUBLICATIONS

Office Action of U.S. Appl. No. 15/639,357 dated Jan. 4, 2019, 21 pages.

(Continued)

*Primary Examiner* — Anabel Ton
(74) *Attorney, Agent, or Firm* — Rankin, Hill & Clark LLP

(57) ABSTRACT

A luminescent feature on a vehicle and a method for installing the same on a vehicle includes a transparent window panel positioned on the vehicle, a conductive material extending along at least a portion of a perimeter of the window panel and at least one electroluminescent pigment strip. The window panel has an interior surface and an exterior surface. Each at least one electroluminescent pigment strip has a first end portion in electrical contact with the conductive material at a first location along the perimeter of the window panel and a second end portion in electrical contact with the conductive material at a second location on the perimeter of the window panel that is spaced apart from the first location.

24 Claims, 3 Drawing Sheets

(56) References Cited

U.S. PATENT DOCUMENTS

| | | |
|---|---|---|
| 5,434,013 A | 7/1995 | Fernandez |
| 5,561,667 A | 10/1996 | Gerlach |
| 5,593,782 A | 1/1997 | Budd |
| 6,123,871 A | 9/2000 | Carroll |
| 6,517,226 B1 | 2/2003 | Zimmermann et al. |
| 6,616,312 B2 | 9/2003 | Carter |
| 6,641,276 B1 | 11/2003 | Macher et al. |
| 6,673,437 B2 | 1/2004 | Kohla et al. |
| 6,758,510 B1 | 7/2004 | Starling |
| 7,118,239 B2 | 10/2006 | Itoh et al. |
| 7,195,381 B2 | 3/2007 | Lynam et al. |
| 7,210,829 B2 | 5/2007 | Okazaki et al. |
| 7,234,850 B2 | 6/2007 | Garcia et al. |
| 7,237,933 B2 | 6/2007 | Radu et al. |
| 8,016,465 B2 | 9/2011 | Egerer et al. |
| 8,106,578 B2 | 1/2012 | Brown et al. |
| 8,113,695 B2 | 2/2012 | Meinke et al. |
| 8,162,520 B2 | 4/2012 | Penner |
| 8,256,945 B2 | 9/2012 | Choquet |
| 8,333,492 B2 | 12/2012 | Dingman et al. |
| 8,339,252 B2 | 12/2012 | Ozaki |
| 8,345,095 B2 | 1/2013 | Oizumi et al. |
| 8,408,766 B2 | 4/2013 | Wilson et al. |
| 8,456,082 B2 | 6/2013 | Stiles et al. |
| 8,469,562 B2 | 6/2013 | Marzorati et al. |
| 8,470,388 B1 | 6/2013 | Zsinko et al. |
| 9,067,556 B2 | 6/2015 | Bosch et al. |
| 9,315,148 B2 * | 4/2016 | Schwenke ............... B60Q 3/64 |
| 2004/0090317 A1 | 5/2004 | Rothkop |
| 2004/0110026 A1 | 6/2004 | Richards et al. |
| 2005/0190570 A1 * | 9/2005 | Roessler ............... B60Q 3/68<br>362/503 |
| 2006/0034092 A1 * | 2/2006 | Okazaki ............... B60Q 3/64<br>362/489 |
| 2006/0097633 A1 | 5/2006 | Cho et al. |
| 2006/0138948 A1 | 6/2006 | Ray et al. |
| 2009/0129107 A1 | 5/2009 | Egerer et al. |
| 2009/0219468 A1 | 9/2009 | Barton et al. |
| 2009/0251917 A1 | 10/2009 | Wollner et al. |
| 2010/0265731 A1 * | 10/2010 | Van Herpen ............. B60Q 1/52<br>362/543 |
| 2010/0283007 A1 | 11/2010 | Robinson |
| 2010/0302020 A1 | 12/2010 | Lenneman et al. |
| 2010/0321946 A1 | 12/2010 | Dingman et al. |
| 2012/0001406 A1 | 1/2012 | Paxton et al. |
| 2014/0376243 A1 | 12/2014 | Schwenke et al. |
| 2015/0165964 A1 | 6/2015 | Mori |
| 2016/0280128 A1 | 9/2016 | Cannon |
| 2016/0288709 A1 | 10/2016 | Nespolo et al. |
| 2017/0246989 A1 | 8/2017 | Ben Abdelaziz |
| 2018/0009393 A1 | 1/2018 | Nagashima |
| 2018/0218611 A1 | 8/2018 | Nagura |

FOREIGN PATENT DOCUMENTS

| | | |
|---|---|---|
| EP | 1053910 | 2/2003 |
| EP | 1188615 | 6/2004 |
| EP | 1625971 | 2/2006 |
| GB | 2495964 | 5/2013 |
| JP | 2006137227 | 6/2006 |
| WO | 2003061351 | 7/2003 |
| WO | 20080169978 | 2/2008 |

OTHER PUBLICATIONS

Office Action of U.S. Appl. No. 15/639,357 dated Aug. 27, 2018, 29 pages.
Internet Website: http://www.wranglerforum.com/f274/interior-paint-job-212857.html; regarding blog entitled "Interior paint job?" by Jakebar777 and Darkfire; printed Jun. 30, 2017.
Internet Website: http://www.autoblog.com/2004/08/04/volvo-invents-blis-blind-spot-info-system-actual-happiness/, auto blog, by Christopher Diken, Aug. 4, 2004.
Internet Website: http://www.dedona.com/blind-spot-monitoring-and-alert-systems/, DeDona Tint & Sound, Nov. 3, 2013.
Office Action of U.S. Appl. No. 15/639,306 dated Sep. 4, 2018, 19 pages.
NOA of U.S. Appl. No. 15/639,306 dated Feb. 21, 2019, 17 pages.
NOA of U.S. Appl. No. 15/639,734 dated Apr. 10, 2019, 33 pages.

* cited by examiner

VEHICLE ASSEMBLY HAVING LUMINESCENT FEATURE AND METHOD

BACKGROUND

Attempts have been made to apply electroluminescent-type lighting to vehicles. One difficulty of applying electroluminescent-type materials to vehicles is doing so in a manner that does not detract from the appearance of the vehicle.

SUMMARY

According to one aspect, a vehicle structure includes a body structure defining an opening and a transparent window panel disposed in the opening. The window panel has an interior surface and an exterior surface. A conductive material extends along a perimeter of the window panel and an electroluminescent pigment has a first end portion disposed at a first location on the perimeter of the window panel and a second end portion disposed at a second location on the perimeter of the window panel that is spaced apart from the first location on the perimeter of the window panel. The electroluminescent pigment is electrically connected to the conductive material.

According to another aspect, a luminescent feature on a vehicle includes a transparent window panel positioned on the vehicle, a conductive material extending along at least a portion of a perimeter of the window panel and at least one electroluminescent pigment strip. The window panel has an interior surface and an exterior surface. Each at least one electroluminescent pigment strip has a first end portion in electrical contact with the conductive material at a first location along the perimeter of the window panel and a second end portion in electrical contact with the conductive material at a second location on the perimeter of the window panel that is spaced apart from the first location.

According to a further aspect, a method of installing a luminescent feature on a vehicle includes providing a transparent window panel for mounting on the vehicle, applying a conductive material along at least a portion of a perimeter of the window panel, and applying at least one electroluminescent pigment strip to the window panel. The window panel has an interior surface and an exterior surface. Application of the pigment strip to the window panel includes electrically connecting the first end portion of each at least one electroluminescent pigment strip to the conductive material at a first location along the perimeter of the window panel and electrically connecting a second end portion of each at least one electroluminescent pigment strip to the conductive material at a second location along the perimeter of the window panel that is spaced apart from the first location.

According to still another aspect, a vehicle assembly includes a body structure defining an opening and a transparent window panel disposed in the opening. The vehicle assembly further includes a first transparent electrode coating on the transparent window that comprises an electrically conductive polymer, a transparent topcoat that comprises a color conversion additive, a second transparent electrode positioned between the transparent topcoat and the first transparent electrode layer that comprises an electrically conductive polymer and a phosphor layer positioned between the first transparent electrode layer and the second transparent electrode layer that is excitable by an electrical field established across the phosphor layer upon application of an electrical charge between the first transparent electrode layer and the second transparent electrode layer to emit an electroluminescent light of a first color to both the first transparent electrode that permits transmission of the light emitted of the first color by the phosphor layer to illuminate the exterior of the vehicle and the transparent topcoat that permits transmission of only a portion of the light emitted by the phosphor layer to convert the light emitted by the phosphor layer to a light of a different color to illuminate the interior of the vehicle with a second color that is different from the first color.

DETAILED DESCRIPTION

Figure 1:
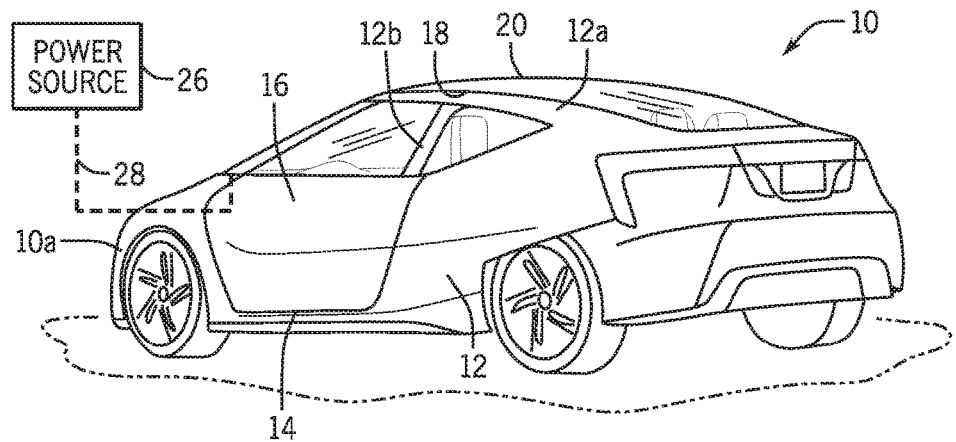
FIG. 1 is a perspective schematic view of a vehicle having a luminescent feature applied thereon according to an exemplary embodiment.

Referring now to the figures wherein the showings are for purposes of illustrating one or more embodiments only and not for purposes of limiting the same, FIG. 1 schematically illustrates a vehicle 10 on which a luminescent feature can be provided as will be described in more detail below. With additional reference to FIGS. 2-3, the vehicle 10 includes a body structure 12 that defines at least one opening (e.g., sunroof opening 18). In particular, the illustrated vehicle 10 can include a left-side door opening 14 having a left-side door 16 arranged therein (shown in FIG. 1), a right-side door opening having a right-side door arranged therein (neither shown) and a sunroof opening 18 provided in a roof portion 12a of the body structure 12 (shown in FIGS. 1 and 2). A transparent window panel 20 (window panel 20) is positioned on the vehicle 10. In particular, in the illustrated embodiments, the window panel 20 is disposed in the sunroof opening 18 defined in the roof portion 12a of the body structure 12. The window panel 20 has an interior surface 20a (shown FIG. 3) and an exterior surface 20b (shown in FIG. 2).

Figure 4:
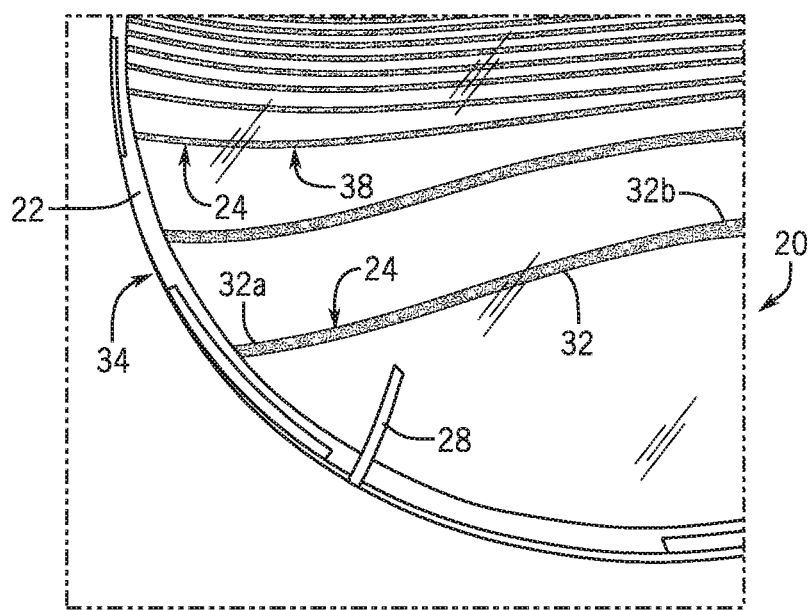
FIG. 4 is a partial view of the window panel shown removed from the vehicle and shown from an underside perspective to illustrate a conductive material extending along the perimeter of the window panel and a wire for electrically connecting the conductive material to a power source.

With further reference to FIG. 4, a conductive material 22 extends along a perimeter of the window panel 20, and particularly along at least a portion of a perimeter of the window panel 20. As will described further hereinbelow, an electroluminescent pigment 24 can be applied to the window panel 20 in electrical contact with the conductive material 22 for providing illumination for the vehicle 10. In particular, and as will be described more specifically below, the electroluminescent pigment 24 can have a first end portion disposed at a first location on the perimeter of the window panel 20 and a second end portion disposed at a second location on the perimeter of the window panel 20 that is spaced apart from the first location on the perimeter on the window panel.

The electroluminescent pigment 24 can be electrically connected to the conductive material 22, which itself can be electrically connected to a power source (shown schematically in FIG. 1) to thereby provide power to the electroluminescent pigment 24 for illumination thereof. In particular, a wire 28 (shown in part in FIG. 4) can electrically connect the conductive material 22 to the power source 26 to thereby electrically connect the electroluminescent pigment 24 to the power source 26. The wire 28 can extend from the conductive material 22 downward along a body pillar (e.g., A-pillar 12b, shown in FIG. 1) supporting the roof portion 12a to the power source 26 (shown in FIG. 1).

Figure 2:
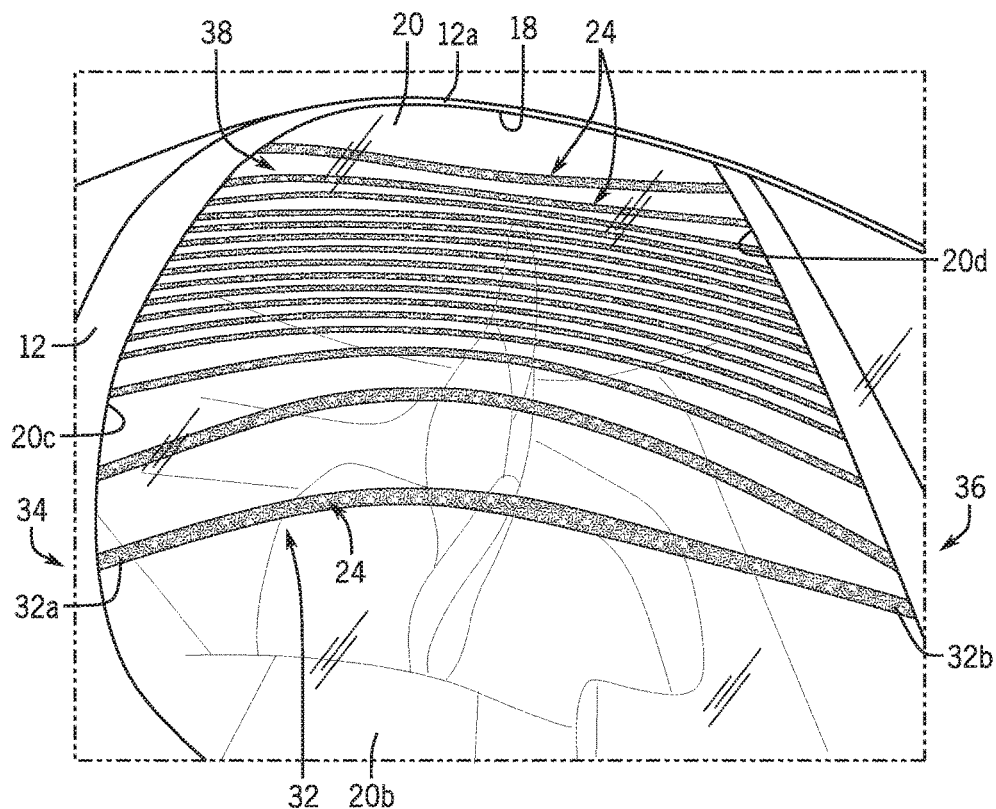
FIG. 2 is a partial top perspective view of the vehicle of FIG. 1 showing a transparent window panel (e.g., a sunroof) positioned on the vehicle and having a plurality of electroluminescent pigment strips applied to the transparent window panel.

In one embodiment, the electroluminescent pigment 24 can be at least one electroluminescent pigment strip 32 (strip 32) wherein each said at least one strip 32 has a first end portion in electrical contact with the conductive material 22 at a first location along the perimeter of the window panel 20 and a second end portion in electrical contact with the conductive material 22 at a second location on the perimeter of the window panel 20 that is spaced apart from the first location. For example, as shown in FIG. 2, the strip 32 can have a first end portion 32a in electrical contact with the conductive material 22 at first location 34 along the perimeter of the window panel 20 and a second end portion 32b in electrical contact with the conductive material 22 at second location 36 on the perimeter of the window panel 20 that is spaced apart from the first location 34.

Figure 3:
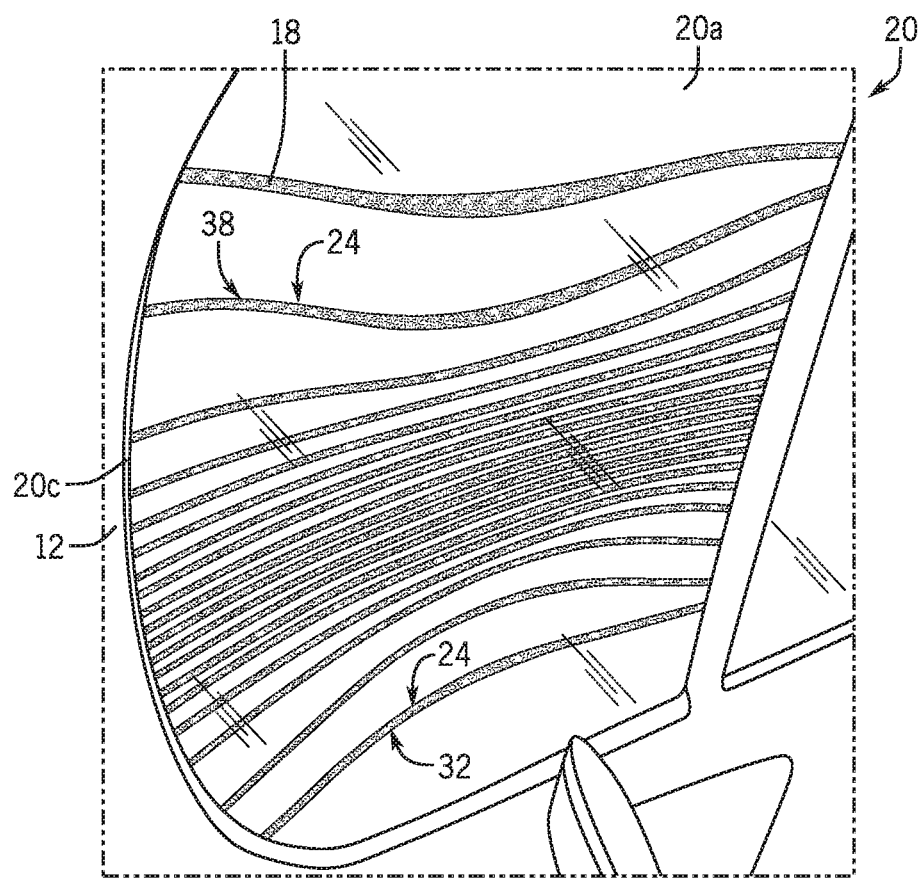
FIG. 3 is an underside perspective view of the window panel of FIG. 2.

In the illustrated embodiment, the electroluminescent pigment 24 extends from a forward side 20c of the window panel 20 to a rearward side 20d of the window panel 20. As shown, the forward side 20c is closer to a forward end 10a of the vehicle 10 (shown in FIG. 1) on which the window panel 20 is disposed. In the illustrated embodiment, the electroluminescent pigment 24 includes a plurality of strips, including the strip 32 and other electroluminescent pigment strips 38 (strips 38), which can be the same or similar to the strip 32. As shown, the plurality of strips 32, 38, including each of the strip 32 and strips 38, can extend from one side of the window panel 20, such as from the forward side 20c, to an opposite side of the window panel 20, such as the rearward side 20d. As best shown in FIG. 3, the electroluminescent pigment 24, and specifically the strips 32 and 38, are disposed on the interior surface 20a of the window panel 20, though this is not required. As also shown, the plurality of strips 32, 38 can be spaced apart from one another, such as laterally spaced apart across the vehicle's width. Additionally, as shown in FIG. 4, the plurality of strips 32, 38 can be only in electrical contact with one another through the conductive material 22 extending along at least a portion of the perimeter of the window panel 20.

In one embodiment, the conductive material 22 can extend along a majority of the perimeter of the window panel 20. In particular, the conductive material 22 can extend along substantially an entirety of the perimeter of the window panel 20, though this is not required. By this arrangement, the conductive material 22 can provide an appropriate electrical connection location for each of the plurality of strips 32, 38 of the electroluminescent pigment 24. Advantageously, the conductive material 22 can be a material provided in a variety of colors including, but not limited to, a black material to provide improved aesthetics for the vehicle 10.

Figure 5:
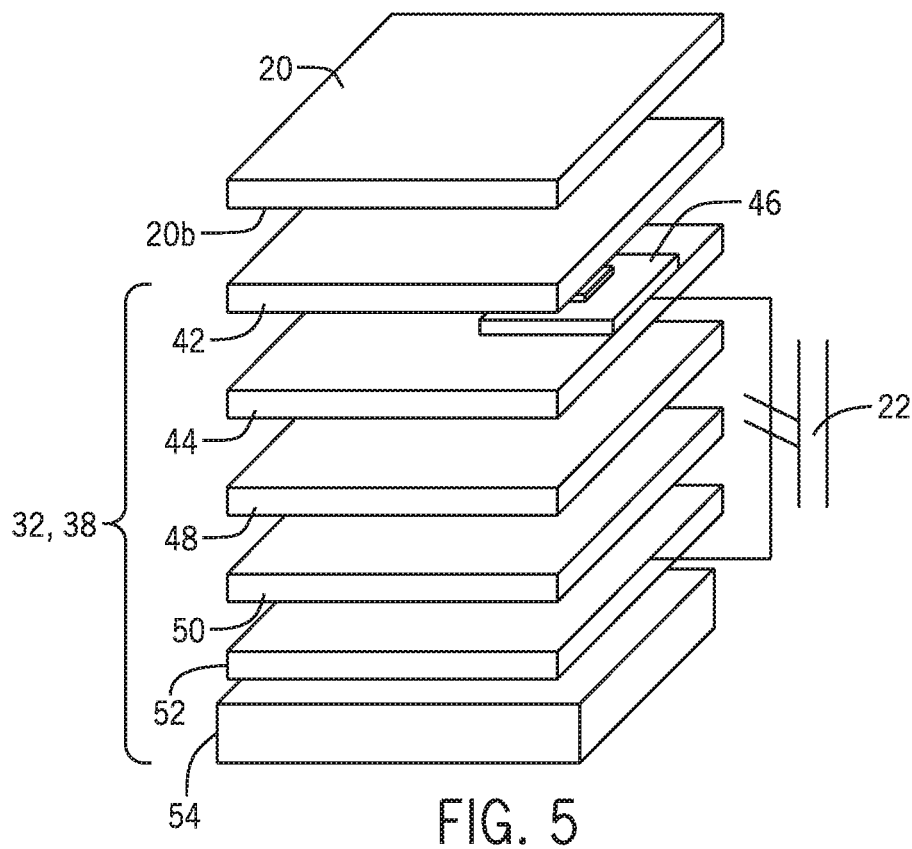
FIG. 5 is a schematic partial exploded view of a portion of one of the electroluminescent pigment strips shown in FIGS. 2-3.

In a non-limiting example, the plurality of electroluminescent pigment strips 32, 38 may be in the form of the electroluminescent lamps disclosed in U.S. Pat. No. 8,470,388, the contents of which are incorporated by reference herein. With reference to FIG. 5, an exemplary schematic stacking arrangement for each electroluminescent pigment strip 32, and other electroluminescent pigment strips 38 is illustrated. As already described herein, each of the plurality of strips 32, 38 is disposed on the interior surface 20a of the window panel 20. It is to be understood that the strips 32, 38 can be disposed on the interior surface 20a, the exterior surface 20b, or both the interior surface 20a and 20b. Accordingly, the conductive material 22 can be disposed about the perimeter of the interior surface 20a and/or the exterior surface 20b.

As shown, one or more top layers 42 (e.g., two top layers 42 in the illustrated embodiment) can be provided as a transparent top coat that provides protection to each of the plurality of pigment strips 32, 38. The one or more top layers 42 can have a total thickness of 25 microns to 125 microns. An electrically conductive top electrode 44 is provided under the one or more top layers 42. The top electrode 44 is a film coating layer that is preferably both electrically conductive and generally transparent to light. Top electrode 44 may comprise such materials as, without limitation, conductive polymers (PEDOT), carbon nanotubes (CNT), antimony tin oxide (ATO) and indium tin oxide (ITO). An illustrative commercial product is CLEVIOS™ conductive, transparent and flexible polymers (available from Heraeus Clevios GmbH of Leverkusen, Germany) diluted in isopropyl alcohol as a thinner/drying agent. CLEVIOS™ conductive polymers exhibit relatively high efficacy. In addition, CLEVIOS™ conductive polymers are based on a styrene co-polymer and thus provides a ready mechanism for chemical crosslinking/mechanical bonding with the underlying phosphor layer 48. In a non-limiting example, the top electrode 44 has a thickness of 1 to 25 microns.

A busbar 46 is interposed between the top layer 42 and the top electrode 44. The bus bar 46 may be provided as a relatively low-impedance strip of conductive material, usually comprised of one or more of the materials usable to produce the bottom or rear electrode 52. In an illustrative example, the bus bar 46 is comprised of silver. The bus bar 46 is typically applied to the peripheral edge of the lit field. Although bus bar 46 is generally shown as on top of the top electrode 44 in the figures, the bus bar 46 may be applied adjacent to the top electrode 44, or below the top electrode 44.

Below the top electrode 44, a phosphor layer 48 is provided. Phosphor layer 48 is a semi-conductive film coating layer comprised of a material (such as metal-doped Zinc Sulfide (ZnS)) encapsulated within an electrostatically permeable polymer matrix. When excited by the presence of an alternating electrostatic field generated by an AC signal, the doped ZnS absorbs energy from the field, which it in turn re-emits as a visible-light photon upon returning to its ground state. In a non-limiting example, the phosphor layer 48 comprises about a 2:1 solution of co-polymer and dilute ammonium hydroxide. To this solution, a quantity of metal-doped ZnS based phosphors doped with at least one of copper, manganese and silver (i.e., ZnS:Cu, Mn, Ag, etc.) pre-wetted in a dilute ammonium hydroxide is added to form a supersaturated suspension. In a non-limiting example, the phosphor layer 48 comprises a thickness of 30 to 100 microns.

Below the phosphor layer 48, a dielectric layer 50 is provided that insulates the phosphor layer 48. Dielectric layer 50 may be an electrically non-conductive film coating layer comprising a material (typically Barium Titanate—$BaTiO_3$) possessing high dielectric constant properties encapsulated within an insulating polymer matrix having relatively high permittivity characteristics (i.e., an index of a given material's ability to transmit an electromagnetic field). In an illustrative example, the dielectric layer 50 comprises about a 2:1 solution of co-polymer and dilute ammonium hydroxide. To this solution a quantity of $BaTiO_3$, which has been pre-wetted in ammonium hydroxide, may be added to form a supersaturated suspension. In a non-limiting example, the dielectric layer 50 may comprise at least one of a titanate, an oxide, a niobate, an aluminate, a tantalate, and a zirconate material, among others.

Below the dielectric layer 50, a rear electrode layer 52 is provided that is electrically connected to the conductive material 22. The rear electrode layer 52 is a film coating layer that may be a sprayable conductive material and may form the rough outline of the lit EL "field". In a non-limiting example, the rear electrode 52 may be made using a highly conductive, generally opaque material. Examples of such materials include, without limitation, an alcohol/latex-based, silver-laden solution such as SILVASPRAY™ available from Caswell, Inc. of Lyons New York, and a water-based latex, copper-laden solution such as "Caswell Copper" copper conductive paint, also available from Caswell, Inc., and mixtures thereof.

In a non-limiting example, the rear electrode 52 may be a metal plating wherein a suitable conductive metal material is applied to a non-conductive substrate 12 using any suitable process for the select metal plating. Example types of metal plating include, without limitation, electroless plating, vacuum metalizing, vapor deposition and sputtering.

The rear electrode 52 may also be an electrically conductive, generally clear layer such as, without limitation, "CLEVIOS™ S V3" and or "CLEVIOS™ S V4" conductive polymers, available from Heraeus Clevios GmbH of Leverkusen, Germany. This configuration allows for two way illumination. In a non-limiting example, the interior of the vehicle 10 may also be illuminated when the electroluminescent strip 32/38 is positioned on the exterior side 20b of the window 20.

Finally, a primer layer (not shown) may be positioned between the window 20 and the rear electrode 52. The primer layer may be oxide-based and may serve to electrically insulate the subsequent conductive and semi-conductive layers from the window 20, and/or may also promote adhesion between window 20 and subsequent layers. In a non-limiting example, the primer layer may be a transparent layer, such as a transparent polymeric material. Illustrative examples include polyurethane coatings such as single or two-component polyurethane systems.

The conductive material 22 may comprise any of the materials that may be used for the top electrode 44 or the rear electrode 52. The conductive material 22 may be a clear or transparent layer, and may be covered by a trim peace or sealant surrounding the window 20.

Figure 6:
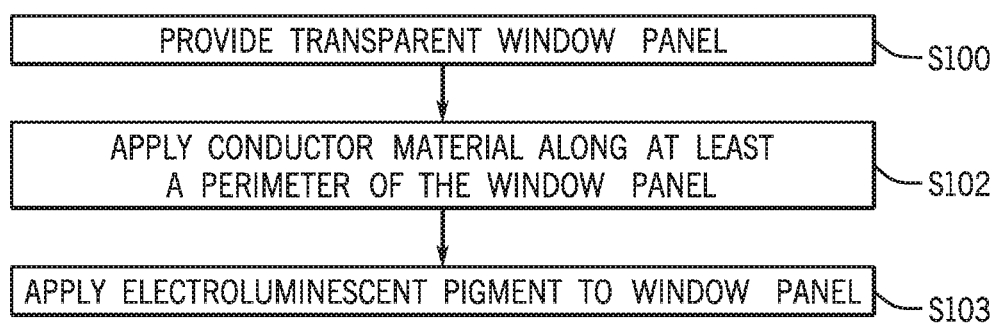
FIG. 6 is a schematic block diagram illustrating a method of installing a luminescent feature on a vehicle according to an exemplary embodiment.

With reference to FIG. 6, a schematic block diagram illustrating a method of installing a luminescent feature on a vehicle according to an exemplary embodiment will now be discussed. The method will be described in association with the vehicle assembly discussed hereinabove (shown in FIGS. 1-5), though this is not required and the method can be used with other vehicle assemblies. In the method, at S100, the window panel 20 can be provided for mounting on the vehicle 10. At S102, the conductive material 22 can be applied along at least a portion of the perimeter of the window panel 20. At S103, the at least one electroluminescent pigment strip, such as strip 32 and/or strips 38, can be applied to the perimeter of the window panel 20. This can include electrically connecting the first end portion 32a of each at least one of the plurality of strips 32, 38 to the conductive material 22 at the first location 34 along the perimeter of the window panel 20 and electrically connecting the second end portion 32b of each of the at least one of the plurality of strips 32, 38 to the conductive material 22 at the second location 36 along the perimeter of the window panel 20 that is spaced apart from the first location 34.

Additionally, the conductive material 22 can be electrically connected to the power source 26 on the vehicle 10 to thereby electrically connect the at least one of the plurality of strips 32, 38 to the power source 26. During operation, a voltage supply to the conductive material 22 can be varied to change a brightness of the at least one of the plurality of strips 32, 38. Also, a frequency of the power supplied to the conductive material 22 can be varied to change a color of the at least one of the plurality of strips 32, 38.

In some embodiments, the luminescent feature can be provided at areas of the vehicle 10 in addition to or in lieu of the window panel 20 of the sunroof opening 18. In one embodiment, one or more side view window openings (not shown) of the vehicle 10 defined in one or more side portions of the body structure 12 that can include a front left side window opening (that is included within the left-side door 16), a front right side window opening, a rear left side window opening, and/or a rear right side window opening, can include the window panel 20. The window panel 20 included within the one or more side view window openings can include the conductive material 22 extending along the parameter of the window panel 20 that can be electrically connected to the power source 26 and the least one of the plurality of strips 32, 38 that include electroluminescent pigment 24 to change the brightness of the at least one of the plurality of strips 32, 38 during operation.

In an alternate embodiment, a front windshield window opening and/or a rear windshield window opening (not shown) of the vehicle 10 can include the window panel 20 that can include conductive material 22 that can be electrically connected to the power source 26 and the least one of the plurality of strips 32, 38. In an additional embodiment, one or more internal areas of the vehicle 10 (e.g., internal glass windows (not shown) between front and rear areas of the vehicle 10) and/or one or more external areas of the vehicle 10 (e.g., glass vehicle lighting housing/casing (not shown)) can include a transparent glass panel (not shown) that includes conductive material 22 that can be electrically connected to the power source 26 and the least one of the plurality of strips 32, 38. In some embodiments, the plurality of strips 32, 38 can be included with a variety of shapes, sizes, configurations, and at a plurality of locations of the window panel 20 at different areas of the vehicle 10.

In an embodiment, a conductive pigment may be applied to the interior 20a of the vehicle window 20 to illuminate both the interior and the exterior of the vehicle. For example, the rear electrode 52 may also be an electrically conductive, generally clear layer that allows light emitted from the phosphor layer 48 to pass through the rear electrode 52 and the window 20 so that it is visible from the exterior of the vehicle 10. In a non-limiting example, the light emitted to the interior of the vehicle 10 may be a different color than that emitted to the exterior of the vehicle 10. The one or more topcoat layers 42 may include an additive that allows the topcoat layer 42 containing the additive to function as a photoluminescent color conversion layer. In a non-limiting example, the additive is cerium doped YAG and the phosphor layer 48 provides a blue light source that excites the cerium doped YAG to convert a portion of the blue light to yellow light to provide a white light to the interior of the vehicle 10. Accordingly, the interior of the vehicle 10 is illuminated with a first light color (such as white) and the exterior of the vehicle 10 is illuminated with a second light color (such as blue) that is different than the first light color. It is to be understood that different phosphorescent materials for the phosphor layer 48 and additives for the topcoat 20 may be used to provide any desired combination of colors for the interior and exterior illumination of the vehicle 10.

In an alternate embodiment, one or more of the strips 32, 38 could include portions therealong that do not include any photoluminescent pigment. This would enable the strips 32, 38 to maintain a uniform brightness where the photoluminescent pigment is provided but allow for gaps between illumination (e.g., islands of illumination along each strip). In the same or another embodiment, a single strip could be used that covers the entire surface of the transparent panel (e.g., panel 20). Optionally, on such a single strip, the photoluminescent material can be provided only on areas necessary to form a graphic, indicia or other desired illuminated shape or pattern. In yet another alternate embodiment, the one or more strips 32, 38 could be provided on a non-transparent panel of the vehicle, such as the door 16, the hood (not shown), etc., for example.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle assembly, comprising:
 a body structure defining an opening;
 a transparent window panel disposed in the opening, the window panel having an interior surface and an exterior surface;
 a conductive material extending along a perimeter of the window panel; and
 an electroluminescent pigment having a first end portion disposed at a first location on the perimeter of the window panel and a second end portion disposed at a second location on the perimeter of the window panel that is spaced apart from the first location on the perimeter of the window panel, the electroluminescent pigment electrically connected to the conductive material,
 wherein the electroluminescent pigment includes a plurality of strips extending from one side of the window panel to an opposite side of the window panel.

2. A vehicle assembly, comprising:
 a body structure defining an opening, wherein the body structure includes a roof portion and the opening is a sunroof opening;
 a transparent window panel disposed in the opening, the window panel having an interior surface and an exterior surface;
 a conductive material extending along a perimeter of the window panel;
 an electroluminescent pigment having a first end portion disposed at a first location on the perimeter of the window panel and a second end portion disposed at a second location on the perimeter of the window panel that is spaced apart from the first location on the perimeter of the window panel, the electroluminescent pigment electrically connected to the conductive material; and
 a wire electrically connecting the conductive material to a power source, wherein the wire extends from the conductive material downward along a pillar supporting the roof body structure to the power source.

3. The vehicle assembly of claim 1 wherein the conductive material extends along substantially an entirety of the perimeter of the window panel.

4. The vehicle assembly of claim 1 wherein the electroluminescent pigment extends from a forward side of the window panel to a rearward side of the window panel, wherein the forward side is closer to a forward end of a vehicle on which transparent window panel is disposed.

5. The vehicle assembly of claim 1 further including:
 a wire electrically connecting the conductive material to a power source.

6. The vehicle assembly of claim 1 wherein the electroluminescent pigment is disposed on the interior surface of the window panel.

7. The vehicle assembly of claim 1 wherein the electroluminescent pigment further has a middle portion disposed between the first end portion and the second end portion, the middle portion spaced apart from the conductive material and only electrically connected to the conductive material through the first and second end portions.

8. A luminescent feature on a vehicle, comprising:
 a transparent window panel positioned on the vehicle, the window panel having an interior surface and an exterior surface;
 a conductive material extending along at least a portion of a perimeter of the window panel; and
 at least one electroluminescent pigment strip, wherein each at least one electroluminescent pigment strip has a first end portion in electrical contact with the conductive material at a first location along the perimeter of the window panel and a second end portion in electrical contact with the conductive material at a second location on the perimeter of the window panel that is spaced apart from the first location, and wherein each at least one electroluminescent pigment strip further has a middle portion disposed between the first end portion and the second end portion, the middle portion spaced apart from the conductive material and only electrically connected to the conductive material through the first and second end portions.

9. The luminescent feature of claim 8 wherein the at least one electroluminescent pigment strip is a plurality of electroluminescent pigment strips extending from a first side of the window panel to a second side of the window panel.

10. The luminescent feature of claim 9 wherein the first side is a forward side and the second side is a rearward side.

11. The luminescent feature of claim 9 wherein the plurality of electroluminescent pigment strips are spaced apart from one another.

12. The luminescent feature of claim 11 wherein the plurality of electroluminescent pigment strips are only in electrical contact with one another through the conductive material extending along at least a portion of the perimeter of the window panel.

13. The luminescent feature of claim 8 wherein the window panel is disposed on a roof of the vehicle.

14. The luminescent feature of claim 13 further including a wire electrically connecting the conductive material to a power source, the wire extending from the conductive material disposed on the roof of the vehicle downward along a body pillar of the vehicle.

15. A luminescent feature on a vehicle, comprising:
a transparent window panel positioned on the vehicle, the window panel having an interior surface and an exterior surface;
a conductive material extending along at least a portion of a perimeter of the window panel; and
at least one electroluminescent pigment strip, wherein each at least one electroluminescent pigment strip has a first end portion in electrical contact with the conductive material at a first location along the perimeter of the window panel and a second end portion in electrical contact with the conductive material at a second location on the perimeter of the window panel that is spaced apart from the first location wherein the conductive material extends along a majority of the perimeter of the window panel.

16. The luminescent feature of claim 15 wherein the conductive material extends along substantially an entirety of the perimeter of the window panel.

17. A method of installing a luminescent feature on a vehicle, comprising:
providing a transparent window panel for mounting on the vehicle, the window panel having an interior surface and an exterior surface;
applying a conductive material along at least a portion of a perimeter of the window panel; and
applying at least one electroluminescent pigment strip to the window panel, including electrically connecting a first end portion of each at least one electroluminescent pigment strip to the conductive material at a first location along the perimeter of the window panel and electrically connecting a second end portion of each at least one electroluminescent pigment strip to the conductive material at a second location along the perimeter of the window panel that is spaced apart from the first location.

18. The method of claim 17 further including:
electrically connecting the conductive material to a power source on the vehicle to thereby electrically connect said at least one electroluminescent pigment strip to the power source.

19. The method of claim 17 further including:
varying a voltage supplied to the conductive material to change a brightness of the at least one electroluminescent pigment strip.

20. The method of claim 17 further including:
varying a frequency supplied to the conductive material to change a color of the at least one electroluminescent pigment strip.

21. A vehicle assembly, comprising:
a body structure defining an opening;
a transparent window panel disposed in the opening;
a first transparent electrode coating on the transparent window that comprises an electrically conductive polymer;
a transparent topcoat that comprises a color conversion additive;
a second transparent electrode positioned between the transparent topcoat and the first transparent electrode layer that comprises an electrically conductive polymer; and
a phosphor layer positioned between the first transparent electrode layer and the second transparent electrode layer that is excitable by an electrical field established across the phosphor layer upon application of an electrical charge between the first transparent electrode layer and the second transparent electrode layer to emit an electroluminescent light of a first color to both the first transparent electrode that permits transmission of the light emitted of the first color by the phosphor layer to illuminate the exterior of the vehicle and the transparent topcoat that permits transmission of only a portion of the light emitted by the phosphor layer to convert the light emitted by the phosphor layer to a light of a different color to illuminate the interior of the vehicle with a second color that is different from the first color.

22. The vehicle assembly of claim 21, wherein the phosphor layer is a blue light-emitting phosphor layer, the color conversion additive comprises a yttrium aluminum garnet (YAG), and the transparent topcoat film permits transmission of only a portion of the blue light to the light of different chromaticity coordinates to illuminate the interior of the vehicle with the second color.

23. The vehicle assembly of claim 22, wherein the yttrium aluminum garnet (YAG) is cerium doped.

24. The vehicle assembly of claim 22, wherein the light of different chromaticity coordinates is white light.

* * * * *